(12) United States Patent
Dawson

(10) Patent No.: US 6,478,504 B1
(45) Date of Patent: Nov. 12, 2002

(54) HUB WITH INTEGRAL KEY AND INTEGRAL POSITIONING STOP

(75) Inventor: Tyler R. Dawson, Williston, VT (US)

(73) Assignee: Vermont Ware, Inc., St. George, VT (US)

(*) Notice: Subject to any disclaimer, the term of this patent is extended or adjusted under 35 U.S.C. 154(b) by 0 days.

(21) Appl. No.: 09/259,420

(22) Filed: Feb. 26, 1999

Related U.S. Application Data

(60) Provisional application No. 60/119,554, filed on Feb. 10, 1999.

(51) Int. Cl.[7] ................................................. F16B 3/00
(52) U.S. Cl. ..................... 403/356; 242/611.2; 474/183; 403/355
(58) Field of Search ........................... 403/270, 271, 403/272, 383, 355, 356, 359.1, 359.6; 242/389, 397, 407, 611.2; 474/169, 170, 171, 174, 179, 180, 183; 74/360

(56) References Cited

U.S. PATENT DOCUMENTS

| | | | |
|---|---|---|---|
| 1,266,579 A | | 5/1918 | Garcelon |
| 1,391,719 A | * | 9/1921 | Conyngham |
| 2,738,681 A | * | 3/1956 | Schultz et al. |
| 3,324,735 A | | 6/1967 | Hanke |
| 3,722,929 A | * | 3/1973 | Gilman |
| 3,739,651 A | * | 6/1973 | Lewis |
| 4,043,214 A | * | 8/1977 | Westlake |
| 4,056,014 A | | 11/1977 | Kraft |
| 4,059,023 A | | 11/1977 | Sproul |
| 4,090,284 A | | 5/1978 | Kraft |
| 4,220,372 A | | 9/1980 | Johansen et al. |
| 4,226,134 A | | 10/1980 | Sohnle |
| 4,525,094 A | * | 6/1985 | Johnson et al. |
| RE32,125 E | | 4/1986 | Von Kaler et al. |
| 5,527,227 A | | 6/1996 | Asai et al. |
| 5,720,685 A | * | 2/1998 | Malone |
| 5,762,439 A | * | 6/1998 | Siner |

FOREIGN PATENT DOCUMENTS

| | | | |
|---|---|---|---|
| DE | 502612 | | 7/1930 |
| DE | 4420822 A1 | | 12/1995 |
| FR | 2 363 722 | * | 3/1978 |
| GB | 2152631 A | | 8/1985 |
| WO | WO 96 05101 A1 | | 2/1996 |

* cited by examiner

Primary Examiner—Lynne H. Browne
Assistant Examiner—Tomlyne Malcolm
(74) Attorney, Agent, or Firm—Theodore R. Touw; James M. Leas

(57) ABSTRACT

A hub for a pulley, gear, or wheel is formed with an integral key or other integral means for preventing relative rotation and with an integral stop for positioning the hub axially on a shaft. The hub has a generally cylindrical opening for a shaft, an integral key extending inwardly into the shaft opening along at least part of the shaft opening for engaging a keyway in the shaft, and an integral mechanical stop covering at least a portion of one end of the shaft opening. The integral key preferably extends the entire length of the shaft opening. The mechanical stop preferably has an opening which is disposed at least around one end of the integral key. The mechanical stop serves to position the pulley, gear, or wheel precisely with respect to the end of a shaft when the pulley, gear, or wheel is assembled onto the shaft. The keyed hub is manufactured by powder metallurgy. One or more body plates are welded to the formed hub to form a pulley, gear, or wheel, or the hub is pressed into a body plate. The shaft opening may be formed with an integral flat or with a polygonal or splined cross-section to prevent rotation of the hub on its shaft, instead of, or in addition to, the integral key.

28 Claims, 6 Drawing Sheets

HUB WITH INTEGRAL KEY AND INTEGRAL POSITIONING STOP

CROSS REFERENCE TO RELATED APPLICATIONS

This application is related to Provisional Patent Application Ser. No. 60/119,554, filed in the United States Patent and Trademark Office on Feb. 10, 1999.

FIELD OF THE INVENTION

This invention relates generally to a hub for a pulley, gear, or wheel. More particularly, it relates to such a hub formed with an integral key or other integral means for preventing relative rotation and with an integral stop for positioning the hub axially on a shaft.

1. Background of the Invention

Pulleys have been made by various processes, including casting or machining of the entire pulley and casting or machining of only a tubular boss or hub, and attachment to that tubular boss or hub of a generally disk-shaped body portion, the latter being made by pressing or stamping from metal plate. Pulleys made by the latter methods often have a belt-mounting portion formed by attaching two generally dish-shaped body portions together back-to-back. For many applications, gears may be made by similar methods, with additional steps for cutting gear teeth. The hubs of both pulleys and gears are often made with a keyway machined to extend radially outward from their inner walls for fitting of a key used with a shaft having a keyway machined radially inward from its outer circumference.

2. Description of the Related Art

U.S. Pat. No. 1,266,579 to Garcelon discloses a pulley fabricated by using a hub and welding disks to the hub to form a pulley.

U.S. Pat. No. 3,324,735 to Hanke discloses a pulley fabricated using sheet metal, with elements projecting radially inward from a tubular member. The elements are tapped for setscrews to engage the shaft.

U.S. Pat. No. 4,059,023 to Sproul discloses a one-piece sintered pulley hub construction formed of powder metal with a pair of radially outwardly extending hub pulling flanges. The hub has a generally tubular-shaped body with front and rear end faces and a cylindrical bore extending axially between them. The pulling flanges are formed integrally with the tubular body and extend radially outward from near the front end of the tubular body in diametrically opposite directions, with the front surfaces of the flanges preferably lying in the same plane with the front end face of the tubular body. The flanges provide lugs for gripping by a hub-pulling device, and they enable the hub to be formed in one piece by a powder metal sintering process.

U.S. Pat. Nos. 4,056,014 and 4,090,284 to Kraft discloses a method of making a sintered pulley hub construction for mounting on a bottom wall of a sheet metal pulley cup. A pair of tubular members is pressure-formed in a green compact state from a metal powder mixture. One of the members has a cylindrical body which terminates at one end in an outwardly extending annular flange which forms a hub pulling flange. The other member has an interior annular cavity formed in one end and a radially outwardly extending annular flange formed on the other end. The cylindrical body of the one member is telescopically received within the annular cavity of the other member. The members are joined by sintering to form an integral homogeneous body. The method of forming the improved hub includes the steps of separately pressure-forming each of the tubular members in a green compact state in a pair of molds.

U.S. Pat. No. 4,226,134 to Sohnle discloses a belt pulley constructed using two substantially identical stamped sheet metal halves which are so configured as to define a hub region when assembled. One or both of the pulley halves may be provided with a radially inwardly extending nose which engages a key-way on the shaft on which it is mounted, for preventing relative rotation of pulley and shaft.

U.S. Pat. No. 4,220,372 to Johansen et al. discloses a dual wheel and axle assembly having a wedge lock hub and axle assembly with an auxiliary clamp to augment the grip of the hub on the drive axle. A drive is provided to force bushing segments between the wheel hub and the drive axle to firmly lock the wheel hub and axle together. One of the bushing segments has an extension which extends axially along the drive shaft and carries a clamp in the form of at least one U-bolt having curvature mating that of the peripheral surface of the drive axle. The U-bolt is firmly clamped against a portion of the drive axle while the extension of the bushing segment which has an integral key firmly seats in a key slot of the drive axle to augment the grip of the wheel hub on the drive axle to accommodate additional torque produced by adding dual wheels to a conventional single wheel drive on a tractor.

U.S. Pat. Reissue No. RE32,125 to Von Kaler et al. discloses a transmission for changing speed, with a shift mechanism which selectively couples a plurality of change gears one at a time to a shaft on which the gears are journalled. The shift mechanism is disposed entirely within the transmission housing and includes a shift key arranged for axial sliding movement in a groove in the shaft. Change gears have four integral arcuate teeth, extending inward, to journal the gear on a shaft. The axial dimension of each tooth is slightly less than half the axial dimension of the gear.

U.S. Pat. No. 4,525,094 to Johnson et al. discloses a split-flanged circular bushing to be used to secure driving or driven elements such as sheaves, pulleys, and the like, to a rotatable shaft. The bushing has an integrally formed key in its center opening for insertion into a corresponding keyway in the shaft. The bushing is formed in a sintering operation. Increased density is imparted to fillets or junctions between the flange and the outer wall of the body, thereby providing increased resistance to stress fatigue in these critical areas. Fillets between the key and the inner wall of the body are provided to distribute the stress concentration inherent in these areas.

U.S. Pat. No. 5,527,227 to Asai et al. discloses a pulley made from a metal plate by using a press forming technique. The pulley has a thin tubular boss portion and a disk-shaped body portion which are integral. The boss portion may have a reinforcing flange at one open end portion. The reinforcing flange aids in providing sufficient strength against the tightening force of a nut which is screwed onto a shaft inserted into the boss portion and also disperses the tightening force. The pulley may have a key member formed integrally on the boss portion.

U.S. Pat. No. 5,720,685 to Malone shows a molded plastic pulley and stub shaft for the drive train of a clothes-washing machine. A plastic pulley and stub shaft are integrally formed with one another and used as a unitary component in the drive train of the clothes washing machine. The pulley has a co-axial bore on one side for receiving a motor shaft of an electric motor. The pulley also has a circumferential groove configured for receiving a belt. The stub shaft extends co-axially from the opposite side of the pulley as the bore.

PROBLEMS SOLVED BY THE INVENTION

In the assembly of machines using pulleys, the pulleys are sometimes misaligned relative to the ends of their shafts and keys are sometimes inadvertently omitted or lost. Similar problems occur in the use of gears. There is a need for pulleys or gears made to prevent such assembly errors and to improve speed and efficiency of assembling machines.

OBJECTS AND ADVANTAGES OF THE INVENTION

A major object of the invention is to provide a pulley or gear that has integral means for preventing relative rotation such as an integral key and preferably has an integral stop, to prevent errors in assembly of the pulley or gear on a shaft and to allow rapid, properly aligned assembly. Another object is providing a pulley or gear requiring a reduced number of separate parts, thus reducing inventory-keeping and preventing loss of small individual parts.

SUMMARY OF THE INVENTION

A hub for a pulley, gear, or wheel is formed with an integral key or other integral means for preventing relative rotation and with an integral stop for positioning the hub axially on a shaft. The hub has a generally cylindrical (or polygonal) opening for a shaft, an integral key extending inwardly into the shaft opening along at least part of the shaft opening for engaging a keyway in the shaft, and an integral mechanical stop covering at least a portion of one end of the shaft opening. The integral key preferably extends the entire length of the shaft opening. The mechanical stop preferably has an opening which is disposed at least around one end of the integral key. The mechanical stop serves to position the pulley, gear, or wheel precisely with respect to the end of a shaft when the pulley, gear, or wheel is assembled onto the shaft. The keyed hub is manufactured by powder metallurgy. One or more body plates are welded or glued to the formed hub to form a pulley, gear, or wheel, or the hub is pressed into a body plate. The shaft opening may be formed with an integral flat or with a polygonal or splined cross-section to prevent rotation of the hub on its shaft, instead of, or in addition to, the integral key.

DETAILED DESCRIPTION OF THE PREFERRED EMBODIMENTS

Figure 1:
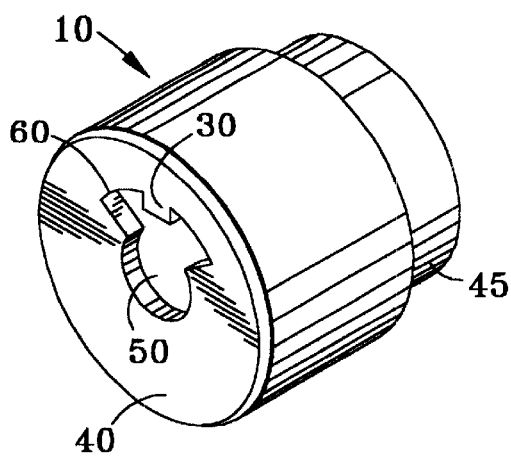
FIG. 1 is a perspective view of a hub for a pulley made in accordance with the invention.
Figure 2:
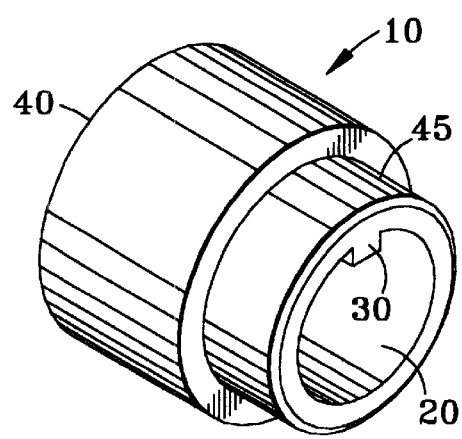
FIG. 2 is a perspective view of the hub of FIG. 1 shown from a viewpoint differing from FIG. 1.
Figure 3:
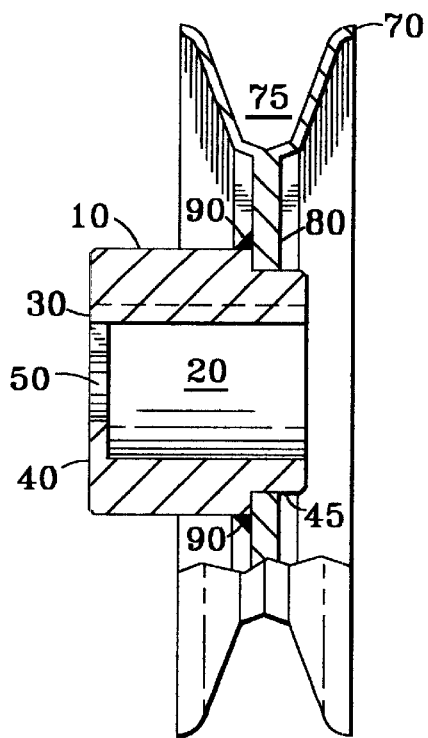
FIG. 3 is a side elevation partially cutaway view of a pulley made in accordance with the invention.
Figure 4:
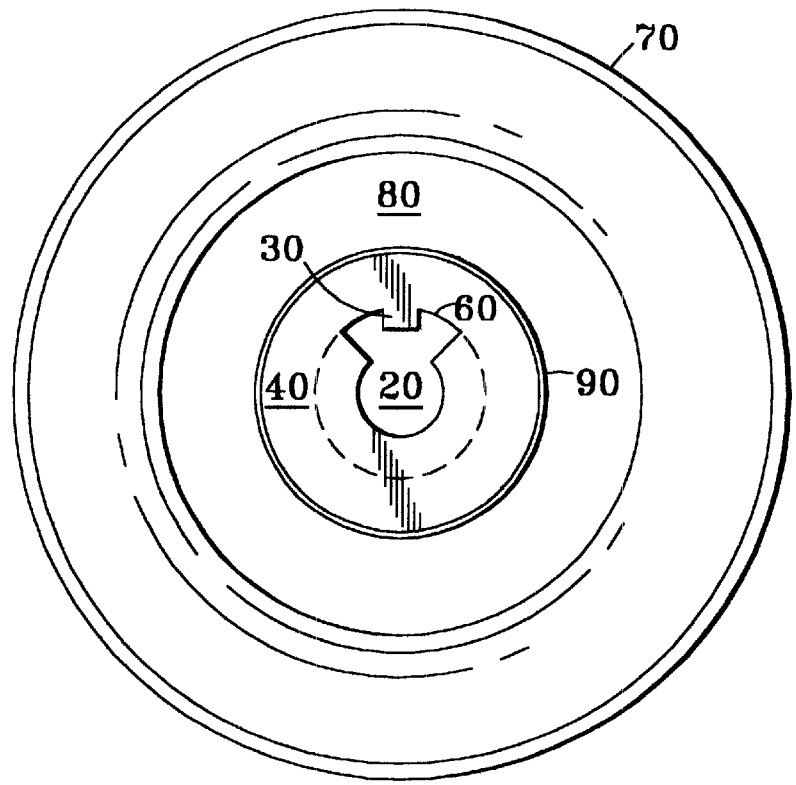
FIG. 4 is a plan view of a pulley made in accordance with the invention.

FIGS. 1 and 2 show perspective views from different viewpoints of a first embodiment of a hub 10 for a pulley or gear made in accordance with the invention. FIG. 3 shows a partially cutaway side elevation view, and FIG. 4 shows a plan view of a pulley made with hub 10. Hub 10 has an opening 20 for a shaft, an integral key 30 for engaging a keyway in the shaft, and an integral mechanical stop 40 extending across at least a portion of one end of opening 20. Mechanical stop 40 serves to position the pulley precisely with respect to the end of a shaft when the pulley is assembled onto the shaft. Integral key 30 preferably extends substantially the entire length of opening 20 of hub 10, as shown in cross-section in FIG. 3. Integral key 30 prevents hub 10 from turning relative to its shaft when assembled onto the shaft. Integral stop 40 may have an opening extending through it and communicating with opening 20, such as generally circular opening 50. In the embodiment shown in FIGS. 1–4, circular opening 50 is concentric with opening 20. Also shown in FIGS. 1 and 4 is an opening portion 60 which communicates with opening 20 and is preferably aligned with one end of integral key 30 so that end of integral key 30 has opening portion 60 around it. Integral key 30 extends into opening portion 60. As shown in FIGS. 1 and 4, the overall shape of opening portion 60 is a "pie shape," i.e., a sector of a circle, bounded by radii defining a sector angle and by the arc subtended by that sector angle.

Hub 10 may have a reduced-diameter portion 45 of suitable depth and width to accommodate attachment of a disk-shaped body 80 against a shoulder. FIGS. 3 and 4 show a pulley having a disk-shaped body 80 affixed by weld 90 to hub 10 at the reduced-diameter portion 45 of hub 10. For making such a pulley the disk-shaped body has a circular rim formed with a peripheral recess for receiving a pulley belt. Also shown in FIG. 3 are circular rim 70 and a peripheral belt-receiving recess 75.

Figure 5:
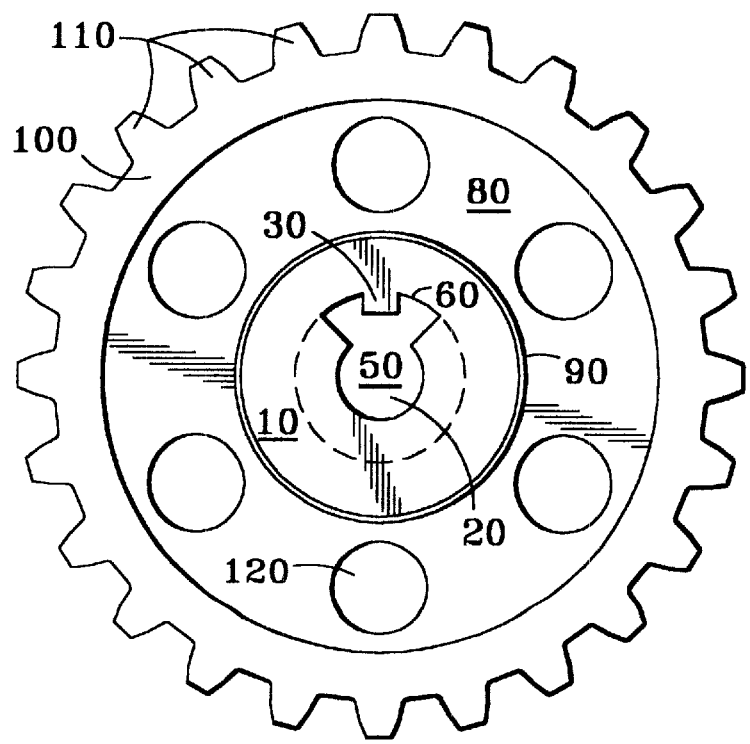
FIG. 5 is a plan view of a gear made in accordance with the invention.

FIG. 5 is a plan view of a gear 100 made in accordance with the invention, with the same hub 10 as in FIGS. 1–4, but having gear teeth 110 cut in its rim. In the gear FIG. 5, additional openings 120 are formed in disk-shaped body 80, to reduce weight.

Hub 10 may have a conventional threaded setscrew hole 65 for attaching the hub to its shaft with a conventional setscrew. Similarly, a conventional through bolt may be employed. However, in a preferred embodiment for many applications, the setscrew is eliminated by the following arrangement. Made with a suitable diameter, opening 50 in FIGS. 1, 3, and 5 may be used for a conventional bolt (not shown) employed to fasten hub 10 onto a shaft having a tapped (internally threaded) hole in the shaft's end. Thus opening 50 provides access to the internally threaded hole by a conventional bolt for fastening the hub to the shaft, with or without an additional flat washer. The shaft may be polygonal, e.g. square, hexagonal, octagonal, etc.

Hub 10 may be cast or machined from steel, but is preferably made by a conventional powder metallurgy process of pressing and sintering metal powder. Generally in such a powder metallurgy process, blended metal powders of suitable composition, particle size, and particle shape are fed into a mold or die, compacted into the desired hub shape, ejected from the die and then sintered (solid state diffused) at a temperature below the melting point of the base material in a controlled atmosphere furnace. The compaction step requires the hub be removable from the die in the vertical direction with no cross movements of the tool members. The sintering step creates metallurgical bonds between the powder particles imparting the necessary mechanical and physical properties to the hub. The steps may be stated as providing a mold shaped to form the hub, filling the mold with metal powder of suitable composition, particle size, and particle shape, compacting the metal powder in the mold at suitable time and pressure to form a preform, removing the preform from the mold, providing a suitable (non-oxidizing) atmosphere, and applying heat to the preform at suitable time and temperature in the non-oxidizing atmosphere to sinter the metal powder. The metal powder is preferably nickel steel powder having a composition by weight of 91.9% to 98.7% Fe, 1.0% to 3.0% Ni, 0.3% to 0.6% C, zero to 2.5% Cu, with any other additional elements amounting to no more than 2.0% maximum. Such a composition corresponds to material designation code FN-0205-20 in the MPIF Standard 35 "Materials Standards for P/M Structural Parts" available from the Metal Powder Industries Federation of Princeton, N.J. (info@mpif.org).

Opening 50, or at least opening portion 60 surrounding one end of integral key 30, helps to prevent undue stress concentrations near the end of integral key 30 that is adjacent to integral stop 40. Such opening arrangements are not necessary, however, for a successful powder metallurgy process for making hub 10.

The advantages of this method for making the hub include the fact that it has the lowest cost of common powder metallurgy manufacturing methods, with modest tooling cost, the fact that little or no secondary machining is required, and the fact that the hub can be made with close tolerances. The same general powder metallurgy manufacturing method can be used with a variety of materials.

Body 80 may be made by metal casting, by spinning, by machining metal stock, by pressing or stamping sheet metal, or by any other suitable method.

Figure 6:
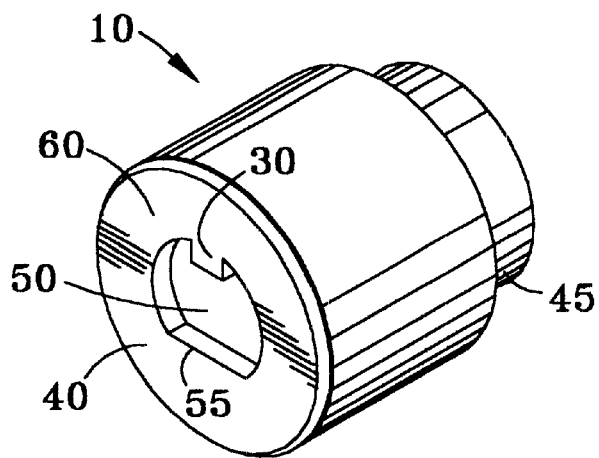
FIG. 6 is a perspective view of a second embodiment of a hub.
Figure 7:
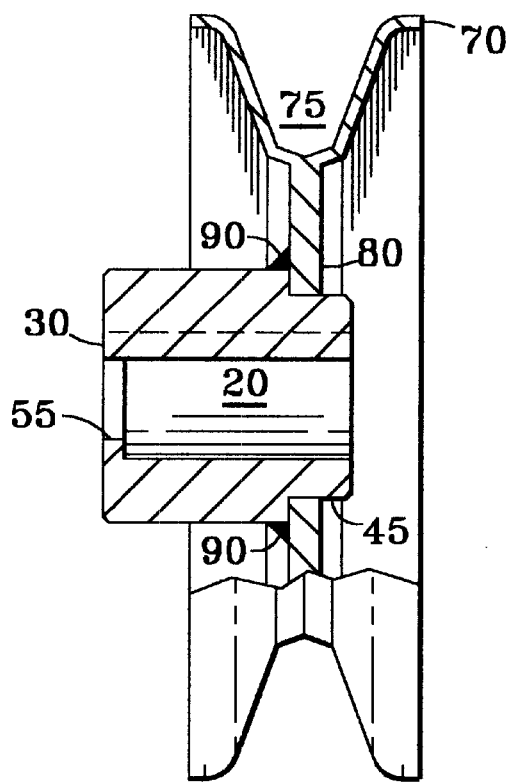
FIG. 7 is a side elevation partially cutaway view of a pulley having the hub embodiment of FIG. 6.
Figure 8:
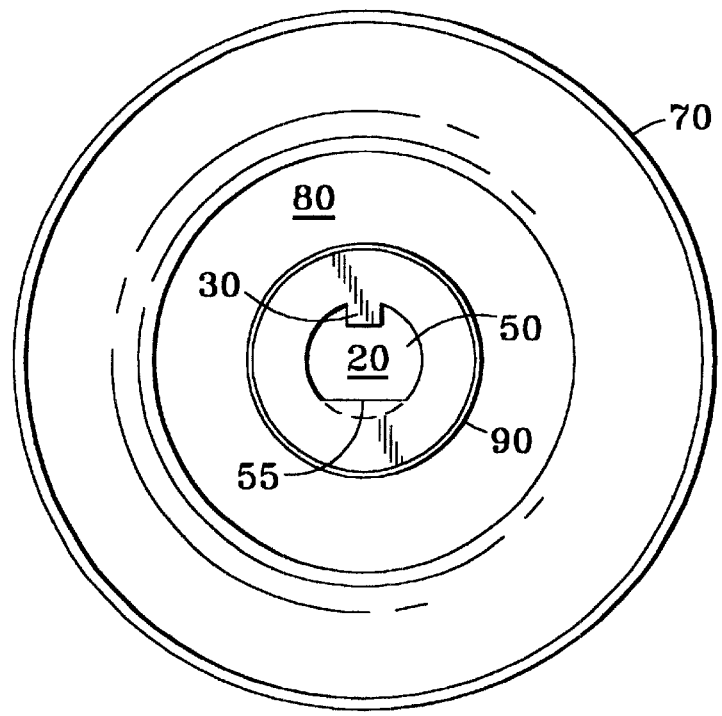
FIG. 8 is a plan view of a pulley made with the hub embodiment of FIG. 6.
Figure 9:
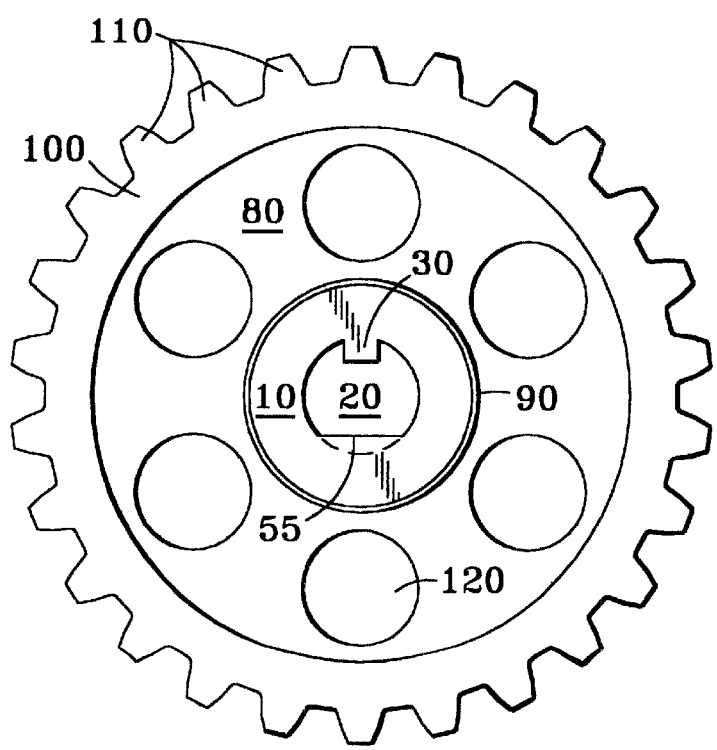
FIG. 9 is a plan view of a gear made with the hub embodiment of FIG. 6.

FIGS. 6–8 illustrate a second, preferred embodiment of the invention. FIG. 6 is a perspective view of a second embodiment of a hub 10. The end of hub 10 not shown in FIG. 6 is the same as FIG. 2. FIG. 7 is a side elevation partially cutaway view and FIG. 8 is a plan view of a pulley having the hub embodiment of FIG. 6. FIG. 9 is a plan view of a gear made with the hub embodiment of FIG. 6. The main feature distinguishing the embodiment of FIG. 6 from that of FIGS. 1–5 is the form of opening 50 in integral stop 40. In FIGS. 6–9, opening 50 has a generally circular form, except for a segment bounded by a flat edge 55. Opening 50 of this embodiment still passes through integral stop 40, communicates with opening 20 for the shaft, and is partially aligned with one end of integral key 30. Made with a suitable diameter, opening 50 in FIGS. 6–9 allows for a bolt that can be used to fasten hub 10 onto a shaft having an internally threaded hole in the shaft's end, with or without an additional flat washer.

As shown in FIG. 6, the integral stop may extend across only a portion of opening 50. In the embodiment of FIG. 6, the integral stop is bounded by a chord formed by flat edge 55, extending across the end of opening 50, so that opening 50 has a segment shape bounded by the chord (flat edge 55).

Figure 10:
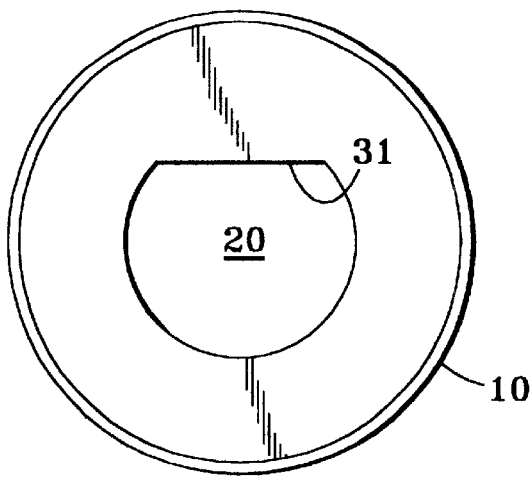
FIG. 10 is a plan view of another embodiment of a hub made in accordance with the invention.

FIG. 10 is a plan view of another embodiment of a hub made in accordance with the invention. In FIG. 10, the integral key 30 is replaced by an integral flat 31, which preferably extends substantially the entire length of opening 20 of hub 10, as the integral key 30 shown in cross-section in FIG. 3 does. Integral flat 31 performs a similar function as integral key 30 in preventing hub 10 from turning relative to its shaft when assembled onto the shaft.

Figure 11:
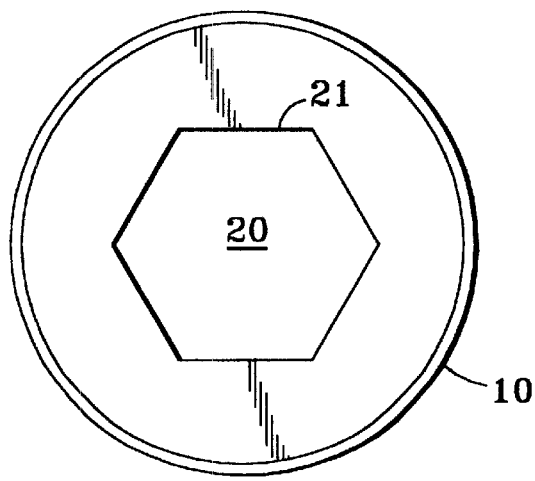
FIG. 11 is a plan view of another embodiment of the hub.

FIG. 11 is a plan view of another embodiment of the hub. Hub 10 of FIG. 11 has a shaft opening 20 having a polygonal form, e.g. hexagonal. It will be apparent to those skilled in the art that the flat portions of the polygonal shaft opening 21 in FIG. 11 perform the same function as integral flat 31 of FIG. 10 or integral key 30 of FIGS. 1–9, viz. preventing hub 10 from turning relative to its shaft when assembled onto a correspondingly shaped shaft. Polygonal shaft opening 21 may have any polygonal shape, for example, square, pentagonal, hexagonal, octagonal, etc.

Figure 12:
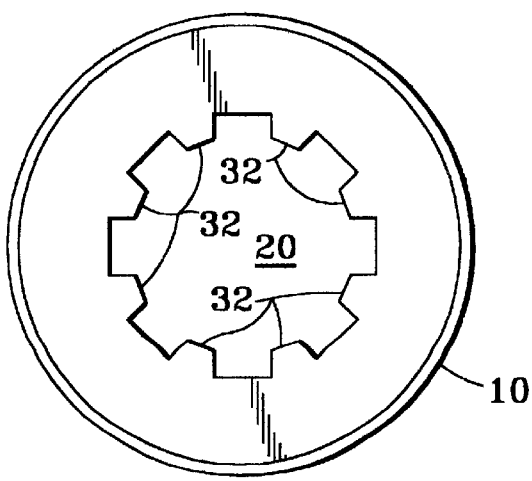
FIG. 12 is a plan view of another embodiment of the hub.

FIG. 12 is a plan view of another embodiment of the hub. Hub 10 of FIG. 12 has a shaft opening 22 having a splined form, i.e. shaft opening 20 has integral splines 32, which function as a multiplicity of integral keys 30 in preventing hub 10 from turning relative to its shaft when assembled onto the shaft.

Figure 13:
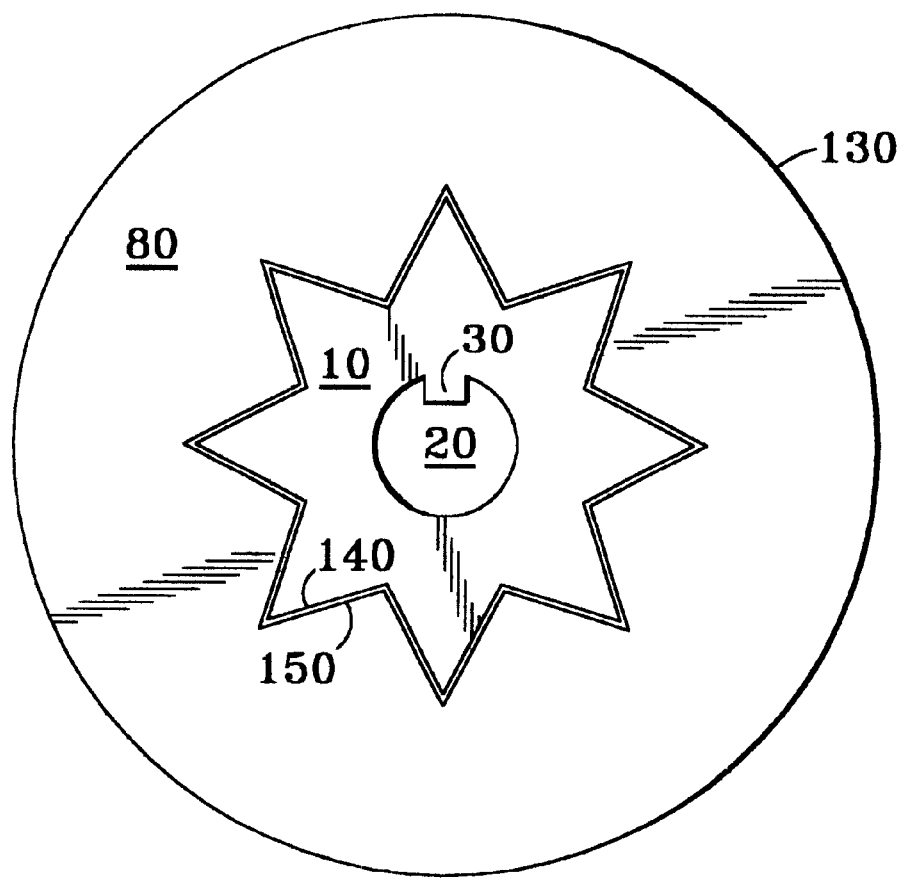
FIG. 13 is a plan view of a wheel having a hub made in accordance with the invention.

FIG. 13 is a plan view of a wheel 130 having a hub 10 made in accordance with the invention. FIG. 13 illustrates another method of affixing hub 10 to body 80, viz. by pressing instead of by welding. This method of affixing hub 10 to body 80 can also be used for a pulley or gear in some applications. The hub of wheel 130 is made with an outer peripheral surface portion 140 fitting tightly within a similarly shaped opening 150 in body 80, and affixed to body 80 by pressing. Outer peripheral surface portion 140 and, correspondingly opening 150, have a form and dimensions suitable for preventing relative rotation of hub 10 and body 80. Outer peripheral surface portion 140 and, correspondingly opening 150, may have any of various forms of right circular cylindrical, elliptical cylindrical, pyramidal, conical, or splined forms, for example, as alternatives to a form such as that shown in FIG. 13. Any suitable shape of outer peripheral surface portion 140 of hub 10 is formed with a suitable powder metallurgy mold or die. The corresponding opening 150 in body 80 may be formed in a complementary matching shape by casting or machining, for example. Although FIG. 13 is drawn for clarity with a visible gap between outer peripheral surface portion 140 of hub 10 and opening 150 in body 80, the dimensions and their tolerances should be suitable for pressing, i.e. to provide a tight press fit.

As de scribed above with reference to FIG. 13 and as shown in FIGS. 14–17, the outer peripheral surface portion 140 of hub 10 may have a suitable form concentric with opening 20, such as a right circular cylindrical form (FIG. 14), a right elliptical cylindrical form (FIG. 15), a pyramidal form (FIG. 16), or a conical form (FIG. 17).

Thus, from one aspect, the invention is a hub for a pulley, gear, or wheel, the hub having a shaft opening for a shaft that may have a keyway, the shaft opening having an inner surface and first and second ends, where the hub comprises integral means for preventing relative rotation, such as an integral key extending radially inward from the inner surface of the shaft opening for engaging the keyway when the hub is disposed on the shaft, and an integral stop extending across at least a portion of either the first or second end of the shaft opening, for preventing the shaft from extending beyond the hub when the hub is disposed on the shaft. Thus the integral stop serves to position a pulley, gear, or wheel having such a hub precisely with respect to the end of the shaft. Thus, also, a pulley's recess for receiving a pulley belt (or the medial plane of a gear's teeth) is aligned to a plane at a known distance from the end of the shaft when the pulley (or gear) is assembled onto the shaft.

INDUSTRIAL APPLICABILITY

The invention has many uses in the fields of automotive equipment, appliances, power tools, hydraulic equipment, lawn and garden machines, agriculture, industrial manufacturing equipment, motors, recreational and exercise equipment, business equipment, and in many other fields which use pulleys or gears. The integral key and integral stop help to prevent errors in assembly of a pulley or gear on a shaft and allow rapid, properly aligned assembly with automatic location on the shaft. The invention has a minimum number of separate parts, thus reducing inventory-keeping and preventing loss of small individual parts.

From the foregoing description of specific embodiments, one skilled in the art can easily ascertain the essential characteristics of this invention, and without departing from the spirit and scope thereof, can make various changes and modifications of the invention to adapt it to various usages and conditions.

Other embodiments of the invention will be apparent to those skilled in the art from a consideration of this specification or from practice of the invention disclosed herein. For example, for light loads, both hub 10 and all other parts can be cast, molded, or machined from plastic materials such as nylon, for example, instead of from the metals used in the embodiments described herein. For some applications, the invention may be made of ceramic by using conventional ceramic manufacturing methods. The hub may be affixed, e.g. by adhesive, or may be molded integrally in a molded part having a hub, a body plate, and a rim suitable for a particular use as a pulley, gear, or wheel. It is intended that the specification and examples be considered as exemplary only, with the true scope and spirit of the invention being defined by the following claims.

Accordingly, the scope of the invention should be determined not by the embodiments illustrated, but by the appended claims and their legal equivalents. The following claims are intended to be representative, but not exhaustive, of claims to be asserted in a utility patent application claiming priority of the present provisional patent application.

Having described my invention, I claim:

1. A hub for mounting a pulley, gear, or wheel on a shaft having a keyway, said hub comprising:
   a first opening extending axially into said hub, said first opening comprising an inner surface for disposing said hub on the shaft, said first opening having a first end and a second end;
   an integral key extending radially inward from said inner surface, said integral key extending at least part of the way along said inner surface between said first end and said second end for engaging the keyway for preventing relative rotation between said hub and the shaft when said hub is disposed on the shaft;
   an integral stop extending across at least a portion of said first end for preventing the shaft from extending beyond said hub when said hub is disposed on the shaft; and
   a mounting surface having a position for mounting the pulley, gear, or wheel on the hub, wherein the shaft extends through the pulley, gear, or wheel when the pulley, gear, or wheel is mounted on said hub, said hub is disposed on the shaft, and the shaft extends to said integral stop.

2. A hub as recited in claim 1, wherein said integral key extends from said first end to said second end of said first opening.

3. A hub as recited in claim 1, further comprising a second opening extending through said integral stop, said second opening communicating with said first opening.

4. An assembly comprising a hub as recited in claim 3 in combination with said shaft and a bolt, wherein said shaft has a tapped hole in said shaft end, whereby said second opening provides access to said tapped hole in said shaft end by said bolt for fastening said hub to said shaft.

5. A hub as recited in claim 3, wherein said second opening is at least partially aligned with said integral key.

6. A hub as recited in claim 3, wherein said integral key extends at least into said second opening.

7. A hub as recited in claim 6, wherein said second opening has a round shape and said second opening is disposed concentrically with said first opening.

8. A hub as recited in claim 6, wherein at least a portion of said second opening has a pie shape and the pie-shaped portion of said second opening is disposed concentrically with said integral key.

9. A hub as recited in claim 6, wherein said integral stop extends across only a portion of one of said first and second ends of said first opening, said integral stop being bounded by a chord extending across said one of said first and second ends of said first opening, said second opening having a segment shape bounded by said chord.

10. A hub as recited in claim 9, wherein said second opening is disposed concentrically with said integral key.

11. A hub as recited in claim 3, wherein said integral key extends through said second opening.

12. A hub as recited in claim 3, wherein said second opening is circular and said second opening has a diameter smaller than said first opening.

13. A hub as recited in claim 12, wherein said second opening is concentric with said first opening.

14. A hub as recited in claim 1, said hub being formed by a powder metallurgy process.

15. A hub as recited in claim 14, said hub being formed by the steps of:
   a) providing a mold,
   b) filling said mold with metal powder of suitable composition, particle size, and particle shape,
   c) compacting said metal powder in said mold at suitable time and pressure to form a preform,
   d) removing said preform from said mold,
   e) providing a non-oxidizing atmosphere, and
   f) applying heat to said preform at suitable time and temperature in said non-oxidizing atmosphere to sinter said metal powder.

16. A hub as recited in claim 15, wherein said metal powder is nickel steel powder having a composition by weight of 91.9% to 98.7% Fe, 1.0% to 3.0% Ni, 0.3% to 0.6% C, zero to 2.5% Cu, and any other elements taken together totaling no more than 2.0% maximum.

17. A hub as recited in claim 1, having an outer surface, said hub further comprising a hole communicating between said inner surface of said opening and said outer surface, said hole being tapped with internal threads for a conventional setscrew, said hole being suitably disposed for attaching said hub to said shaft wherein said hub is prevented from moving axially relative to said shaft.

18. A pulley comprising:
   a) a hub as recited in claim 1, and
   b) a disk-shaped body having a rim formed with a peripheral recess for receiving a pulley belt, said disk-shaped body being affixed to said hub.

19. A pulley as recited in claim 18, wherein said disk-shaped body is affixed to said hub by a weld.

20. A pulley as recited in claim 18, wherein said disk-shaped body is affixed to said hub.

21. A gear comprising:

a) a hub as recited in claim 1, and b) a disk-shaped body having a rim formed with gear teeth, said disk-shaped body being affixed to said hub.

22. A gear as recited in claim 21, wherein said disk-shaped body is affixed to said hub by a weld.

23. A gear as recited in claim 21, wherein said disk-shaped body is affixed to said hub by pressing.

24. A hub for mounting a device on a shaft, the hub comprising a first face and a second face, an opening extending there between, said opening having a length between said first face and said second face, said opening comprising an inner surface, an integral key extending radially inward from said inner surface, said integral key extending at least part of the way between said first face and said second face, said opening and said integral key for receiving a shaft having a keyway, said hub farther comprising an integral stop extending across at least a portion of said opening for preventing the shaft from extending beyond said hub when said hub is disposed on the shaft, the hub flirter comprising a mounting surface having a position for mounting the device on the hub, wherein the shaft extends through the device when the device is mounted on said hub, said hub is disposed on the shaft, and the shaft extends to said integral stop.

25. A hub for mounting a device on a shaft, the shaft having a shaft end, said hub comprising:

a first opening extending axially into said hub, said first opening having an inner surface for disposing said hub on the shaft, said first opening having a first end and a second end;

an integral stop extending across only a portion of said first end, said integral stop for preventing the shaft from extending beyond said hub when said hub is disposed on the shaft; and wherein the shaft extends through the device when the device is mounted on said hub, said hub is disposed on the shaft, and the shaft extends to said integral stop.

26. A hub as recited in claim 25, wherein said hub further comprises a mounting surface having a position for mounting the device on the hub.

27. A hub as recited in claim 25, wherein the shaft extends through the device when the device is mounted on said hub, said hub is disposed on the shaft, and the shaft extends to said integral stop.

28. A hub as recited in claim 25, further comprising means integral with said inner surface of said first opening for preventing relative rotation of said hub on the shaft when said hub is disposed on the shaft.

\* \* \* \* \*